United States Patent
Roeingh et al.

(10) Patent No.: US 8,256,964 B2
(45) Date of Patent: Sep. 4, 2012

(54) PLAIN BEARING, METHOD FOR PRODUCTION, AND USE OF THE PLAIN BEARING

(75) Inventors: Konrad Roeingh, Hilchenbach (DE); Karl Keller, Hilchenbach (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 739 days.

(21) Appl. No.: 12/227,327

(22) PCT Filed: Apr. 25, 2007

(86) PCT No.: PCT/EP2007/003624
§ 371 (c)(1), (2), (4) Date: Nov. 14, 2008

(87) PCT Pub. No.: WO2007/131599
PCT Pub. Date: Nov. 22, 2007

(65) Prior Publication Data
US 2009/0232431 A1 Sep. 17, 2009

(30) Foreign Application Priority Data
May 17, 2006 (DE) .................. 10 2006 023 384

(51) Int. Cl.
*F16C 33/08* (2006.01)
*B21H 5/00* (2006.01)

(52) U.S. Cl. .............. 384/276; 384/913; 427/554
(58) Field of Classification Search ............ 384/276, 384/280, 912, 913; 427/554, 556, 180, 191, 427/205, 292, 328, 376.8, 383.7
See application file for complete search history.

(56) References Cited

U.S. PATENT DOCUMENTS

| | | | | |
|---|---|---|---|---|
| 3,406,445 A | * | 10/1968 | Gunter Kopke et al. | 228/210 |
| 4,758,404 A | * | 7/1988 | Muto | 419/3 |
| 4,790,913 A | * | 12/1988 | Higuchi et al. | 205/154 |
| 5,458,984 A | * | 10/1995 | Negwer | 427/456 |
| 2003/0072670 A1 | | 4/2003 | Toth | |

FOREIGN PATENT DOCUMENTS

| | | |
|---|---|---|
| GB | 2174463 | 11/1986 |
| JP | 2000/017418 | 1/2000 |
| WO | 00/23718 | 4/2000 |

* cited by examiner

*Primary Examiner* — Thomas R Hannon
(74) *Attorney, Agent, or Firm* — Lucas & Mercanti, LLP; Klaus P. Stoffel

(57) ABSTRACT

In the case of a plain bearing having at least one support part (25), which is composed of an iron-containing base material, of a bearing sleeve (24) which is provided at the raceway side with a coating (8, 26) which is composed of a coating material, is formed as a melted-on layer and is metallurgically connected to the base material by an $FeSn_2$-containing connecting zone (9), it is possible to obtain a long service life in that the thickness for the $FeSn_2$-containing connecting zone (9) is at most 10 μm.

33 Claims, 3 Drawing Sheets

PLAIN BEARING, METHOD FOR PRODUCTION, AND USE OF THE PLAIN BEARING

In accordance with a first idea of the invention, the invention concerns a plain bearing with a supporting part/bearing bush made of a ferrous base material, whose bearing surface is provided with a coating, which consists at least of coating material and is metallurgically bonded with the base material by a bonding zone that contains $FeSn_2$.

A further idea of the invention concerns a method for producing a plain bearing of this type, where the bearing surface of a supporting part/bearing bush made of a ferrous base material is provided with a coating that has at least one layer and consists at least partially of bearing metal, and where at least the layer adjacent to the supporting part/bearing bush consists of a material that contains Sn, preferably babbitt metal, which is supplied to the surface to be coated in solid form and is melted onto the base material.

Yet another idea of the invention concerns a preferred use of a plain bearing of this type.

WO 00/23718 discloses a plain bearing and a method of the aforementioned type. According to this well-known proposal, the coating of babbitt metal is alloyed onto the supporting part/bearing bush, which consists of a ferrous material. The formation of an alloy requires the presence of liquid alloying components. To this end, therefore, the amount of heat released during the coating operation must be sufficient not only to melt the babbitt metal but also to produce a metal bath consisting of molten base material on the bearing surface on the upper side of the supporting part. The melts of babbitt metal and ferrous material produced in this way can alloy with each other, thereby producing a large amount of $FeSn_2$. Accordingly, this results in the formation of a comparatively thick bonding zone that consists largely of $FeSn_2$. Although this bonding zone provides a good metallurgical bond between the base material and the coating, $FeSn_2$ is a very brittle material, so that cracks and brittle fracture can occur at fairly low stresses of the known bearing arrangement. In addition, there is the problem that unfavorable cooling can lead to transformation of the ferrous material in the vicinity of the coating to martensite, which is also very brittle, and this exacerbates the aforementioned disadvantage. In the previously known arrangement, the high degree of brittleness and low capacity for stretching in a comparatively thick intermediate zone result in a relatively short service life.

It is also well known that the coating of babbitt metal can be applied to the supporting part/bearing bush by the centrifugal casting process. Of course, this means that a metal bath consisting of molten base material does not form. However, during the solidification of the babbitt metal applied in the centrifugal casting process, separation of the alloying components can occur, in which first acicular crystals composed of $Cu_6Sn_5$ and then cubic crystals composed of SbSn precipitate and finally the tin-rich matrix solidifies. The density of $Cu_6Sn_5$ is greater and that of SbSn is less than the density of the matrix, which remains liquid longer. Accordingly, the $Cu_6Sn_5$ crystals migrate radially outward and thus weaken the region in which the coating of babbitt metal borders on the base material, which can adversely affect the service life. This results in concentrations in the outer region, i.e., the distribution is uneven.

Therefore, proceeding from this prior art, the objective of the present invention is to improve a plain bearing of the aforementioned type and to avoid the disadvantages of the previously known devices of this type, so that a long service life is obtained.

Additional objectives of the present invention are to specify a simple and cost-effective method for producing a plain bearing of the invention and to specify a preferred use of the plain bearing of the invention.

The objective with respect to the plain bearing is achieved, in conjunction with the prior-art plain bearing of this general type, by virtue of the fact that the thickness of the bonding zone that contains $FeSn_2$ is at most 10 µm (microns).

The fact that a bonding zone composed of $FeSn_2$ is not completely suppressed but rather is allowed to a slight extent results in the advantage that good metallurgical bonding of the coating to the ferrous base material of the supporting part/bearing bush and thus strong adhesion are obtained. On the other hand, the low thickness of the bonding zone composed of the brittle $FeSn_2$ ensures that, overall, the deformability of the plain bearing of the invention is not negatively affected to any appreciable extent, so that a sufficiently low risk of brittle fracture and cracking is guaranteed.

The objective of the invention with respect to a method is achieved, in conjunction with the prior-art method of this general type, by virtue of the fact that the transfer of energy to the surface to be coated or to the coating material supplied to this surface for the purpose of melting on at least the first layer of the coating, for example, heat supplied by laser or plasma transfer arc (PTA) or energy supplied by cold gas spraying, is carried out in a controlled way, so that only the supplied coating material completely melts, while the base material remains in a completely solidified state.

The advantageous result of these measures is that so little heat is introduced into the base material that a metal bath composed of molten base material does not form on the surface to be coated, but rather the coating material is melted onto the solid metal substrate, and in consequence of the heat that is present, diffusion starts to occur, which guarantees the desired metallurgical bonding of the coating to the base material. In this regard, the depth of diffusion, which depends on the degree of heating of the base material, can be simply controlled in such a way that the bonding zone obtained here as a result of the diffusion is at most 10 µm and preferably 0.5 to 5 µm. At the same time, it is possible to avoid martensite formation in the region of the base material as well as uneven crystal distribution and a coarse crystalline structure in the region of the coating. Another advantage of the method of the invention can be seen in the fact that toxic bearing metals, e.g., cadmium, can be replaced by environmentally safe elements, such as silver (Ag), zinc (Zn), or the like. The additional advantage that no additives are necessary means that to form the coating, it is possible especially to use ordinary babbitt metal, which contains only tin, antimony, and copper and thus can be obtained at low cost.

Plain bearings of this type are used in the iron and steel industry/metallurgical industry, for example, in rolling stands, presses, etc., specifically, in the bearings of rolls, such as work rolls, intermediate rolls, and back-up rolls, and in the bearings of rolling stands for processing metallic and nonmetallic strips, sheets, and sections, because in these types of applications, the long service life is especially useful for reducing high costs. In this regard, the bearing or bearings are designed as metal plain bearings of an enclosed design, hydrodynamic plain bearings, for example, roll neck bearings, or hydrostatic bearings.

In a refinement of the invention, it is provided that the powder or the wire is supplied on the inner circumference of the bearing in different predetermined zones in order to produce bearing surfaces with different properties. This makes it possible to achieve minimum creep and embedding of dirt particles and to avoid edge loading. Preferably, different bearing metals are used for the different zones to obtain the different properties.

Advantageous embodiments and useful refinements of the primary measures are specified in the dependent claims.

Before the coating operation is carried out, it can be advantageous to clean and/or roughen the surface of the base material that is to be coated. This is conducive to the desired diffusion and thus to the formation of the bonding zone produced by the diffusion. In addition, roughening of the surface prevents reflection of a beam or radiation, and this makes it easier to control the introduction of energy into the base material.

Another effective measure can consist in successively melting on several successive layers of coating material. This ensures that the necessary flow of energy remains as low as possible and yet makes it possible to achieve a relatively great thickness of the coating. The bearings can consist of the same or different materials, which makes it possible to adapt the bearing characteristics to the conditions of each individual case.

It is also useful to apply several layers of coating material that contain different bearing metals to realize different properties.

In another advantageous embodiment, it is provided that the coating material has a thickness that is predetermined in such a way that the maximum of the shear stresses due to the bearing load is located outside the bonding zone and inside the coating. As a result of this measure, the occurrence of the maximum shear stress in the naturally brittle bonding zone is avoided.

It is effective for the coating material to be applied in the form of a succession of beads on the base material. This is conducive to simple control of the energy input. Unevenness produced in this way can be evened out by further introduction of energy, which facilitates the mechanical finishing.

Other advantageous embodiments and useful refinements of the primary measures are specified in the remaining dependent claims and are explained in greater detail in the following descriptions of embodiments on the basis of FIGS. 1 to 3, which are described below.

The principal areas of application of the invention are bearings for rolls of rolling stands in the iron and steel industry or rolling mill industry as well as bearings for presses. The construction and mode of operation of such devices are well known in themselves.

Figure 1:
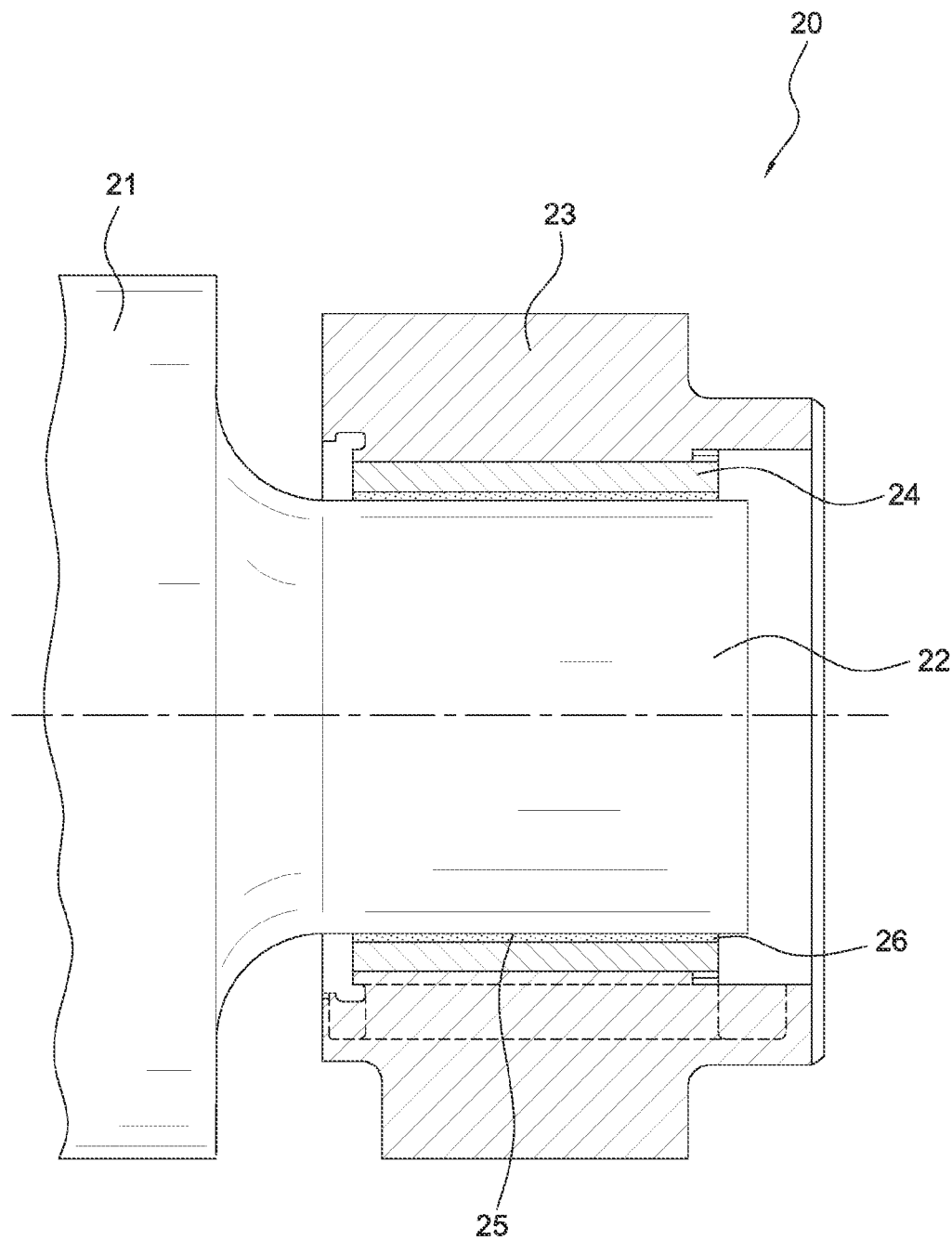
FIG. 1 shows a cross section of a roll neck bearing of a rolling stand roll.

FIG. 1 shows a cross-sectional view of a plain bearing 20 of a roll 21 of a rolling stand for rolling sheets, strips, and sections. In the illustrated arrangement, a roll neck 22 of the roll 21 is mounted in a chock 23 by means of a bearing bush 24. The supporting part 25 of the bearing bush 24 is provided with a coating 26. The coating 26 consists of bearing metal, especially babbitt metal, which offers good emergency running properties.

The bearing surface of the bearing bush 24, i.e., the radially inner surface, is provided with a coating that consists of one or more layers. The bearing bush 24 is composed of an ferrous material, usually steel. The coating 26 consists, at least in the radially outer region that borders on the bearing bush 24, of an Sn-containing material that produces a good bond with the bearing bush 24 and, at least in the radially outer region, of a material with good emergency running properties. Babbitt metals are well suited for both. In practice, tin alloys are referred to as babbitt metals.

The babbitt metal used here to form the coating 8, 26 can be a simple babbitt metal that contains only tin (Sn), antimony (Sb), and copper (Cu) and is free of toxic additives, such as cadmium, which can be replaced by environmentally safe elements, such as silver (Ag), zinc (Zn), or the like.

Figure 2:
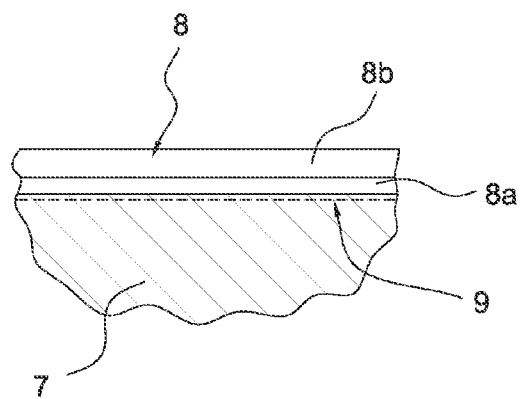
FIG. 2 shows a schematic cross section through a supporting part/bearing bush of a plain bearing that has been furnished with a two-layer bearing metal coating.

The material that forms the coating 8, 26 is melted on the radially inner surface of the steel supporting part 25 of the bearing bush 24 in the form of one or more layers. In this regard, a bonding zone 9, which is indicated in FIG. 2 by a broken line, is formed in the boundary zone between the ferrous base material of the supporting part 25 of the bearing bush 24 and the material of the coating 26. The bonding zone 9 consists essentially of $FeSn_2$, with the iron being derived from the base material and the tin from the coating material. To this end, it is sufficient if the coating consists of tin-containing material at least in its radially outer region that borders on the supporting part 25.

$FeSn_2$ is a very brittle substance, which can adversely affect the service life of the bearing bush 24. On the other hand, however, the bonding zone 9 is needed to obtain a reliable metallurgical bond of the coating material to the ferrous base material.

Extensive testing revealed that at a thickness of the $FeSn_2$ bonding zone of a maximum of 10 µm (10 microns), both good metallurgical bonding of the coating material with the ferrous base material and still sufficient deformability of the coated bearing bush 24 and thus an acceptable service life can be achieved. The tests also showed that at a thickness of the bonding zone 9 of only 0.5 to 5 µm (0.5 to 5 microns), an adequate metallurgical bond is already realized, and especially good deformability is obtained at the same time.

Therefore, the coating material is melted on in such a way that the bonding zone 9 is no thicker than 10 µm and preferably no thicker than 0.5 to 5 µm. To this end, the operation of melting on the coating material is carried out in such a way that the bonding zone 9 is not formed by alloying the participating metals but rather is formed by a diffusion process. The diffusion process is controlled in such a way by suitable heat control that the diffusion depth is at most 10 µm and preferably at most 0.5 to 5 µm.

To this end, the energy applied to melt the coating material onto the ferrous base material of the supporting part 25 of the bearing bush 24 is controlled in such a way that no metal bath consisting of molten base material is produced on the surface to be coated on the supporting part 25 of the bearing bush 24, but rather the base material remains completely in the solidified state, and only the coating material is melted.

Figure 3:
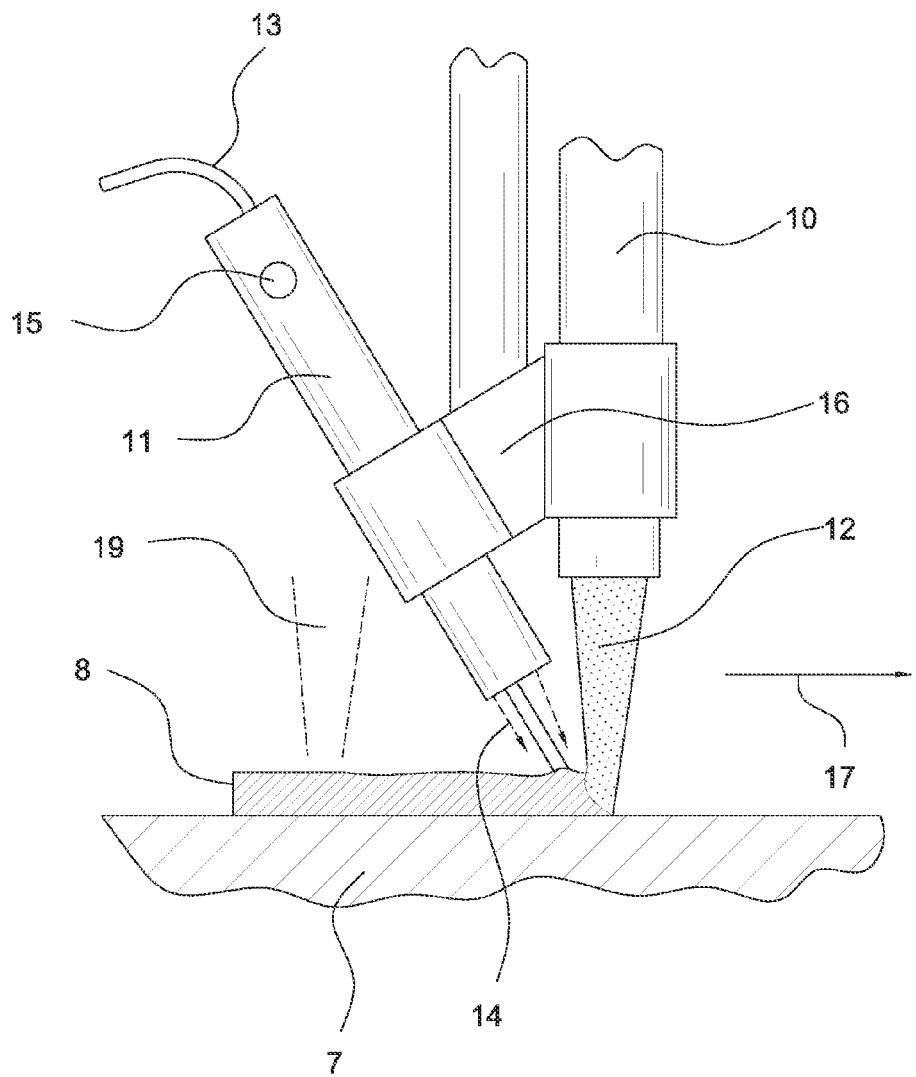
FIG. 3 shows a device for coating the supporting part/bearing bush of a plain bearing with bearing metal.

To melt the coating material onto the ferrous base material, the apparatus illustrated in FIG. 3 is preferably used. This apparatus includes a heating device 10 and a feed unit 11. The heating device 10 produces a laser beam 12, which is oriented more or less perpendicularly to the surface to be coated on the supporting part 25 of the bearing bush 24. The feed unit 11 is inclined to the axis of the laser beam 12. A preferred angle of inclination is 30°. The feed unit 11 feeds the coating material in the solid state to the surface to be coated in such a way that it encounters the laser beam 12.

The coating material to be fed can be present in the form of a powder or in the form of a round or angular wire. In the example illustrated here, the coating material is supplied in the form of a wire 13. Accordingly, the feed unit 11 is designed as an advancing mechanism. If a powdered coating material is used, the feed unit 11 is designed as a blowing nozzle that delivers a stream of powder. Until the coating material has solidified, it is advantageous to supply protective gas around the coating material, as indicated by flow arrows 14 in FIG. 3. It is advantageous to admit the protective gas through the feed unit 11, which is equipped with a suitable supply connection 15.

In the example illustrated here, the heating device 10 and the feed unit 11 are mounted on a common operating head 16. The operating head 16 is arranged in such a way that to carry out the coating process, a relative movement indicated by an arrow 17 can be produced between the operating head 16 and the supporting part 25 of the bearing bush 24 to be coated. In this regard, the relative speed between the operating head 16 and the supporting part 25 to be coated, the coating material throughput produced by the feed unit 11, and the amount of energy introduced by the laser beam 12 into the coating material supplied to the surface to be coated and into the surface to be coated on the supporting part 25 of the bearing bush 24 are coordinated with one another in such a way that the coating material completely melts, but a metal bath consisting of molten base material does not form on the surface to be coated, but rather a diffusion process takes place with the desired depth of diffusion.

It is advantageous if the relative movement between the operating head 16 and the surface to be coated is carried out in such a way that the surface to be coated is covered by the operating head 16 row by row. Due to the row-by-row movement, the coating material is applied to the surface to be coated in the form of parallel beads. The resulting wavy surface can be made level by a second laser beam 19, which is indicated by broken lines in FIG. 3. The heating device 10 necessary for this can also be mounted on the operating head 16. However, it would also be conceivable to provide a common heating device for producing both laser beams 12 and 19. Moreover, it would be conceivable to dispense with a second laser beam and to effect the leveling by means of the laser beam 12 in a second passage carried out without supplying coating material. Laser sources that are especially preferred are those which can be controlled well, such as YAG, $CO_2$, or diode lasers, especially fiber-coupled diode lasers. The easy controllability of the laser source facilitates exact metering of the energy input into the supporting part 7, 25. $CO_2$ and diode lasers have proven especially effective.

It is advantageous to apply the coating material in the form of thin layers, which makes it easier to control the heat input. However, to obtain a relatively large total thickness of the coating, several layers can be applied in succession, as is indicated in FIG. 2 by the layers 8a, 8b applied one over the other. In this process, beads that cross each other can be produced. In any case, the uppermost layer is leveled in the manner described above, which facilitates subsequent mechanical finishing. The layers 8a and 8b can consist of the same material or different materials. In any case, the lower layer, i.e., the radially outer layer. must consist of tin-containing material, such as babbitt metal, in order to form the $FeSn_2$ zone.

Before the start of the coating operation, the surface of the bearing bush to be coated is cleaned and preferably roughened at the same time. This roughening prevents any appreciable reflection of the laser beam 12, which also makes it easier to control the energy input.

Since the energy input involves the application of heat to only a very small surface area, the coating material melted onto the surface cools relatively quickly. Therefore, separation by gravity of the crystals of different density that form during the cooling of the molten coating material in the form of $Cu_6Sn_5$ crystals and SbSn crystals cannot get started. Accordingly, a uniform distribution of the crystals is obtained over the whole thickness of the coating 8, 26. An extremely homogeneous material structure is thus realized. In this connection, the crystals are preferably formed in such a way that their size is less than or equal to 5 µm, and they preferably have a globular structure. The cooling of the coated supporting part 7, 25 can occur in such a way that no transformation to martensite takes place in the ferrous base material of the supporting part 7, 25 of the bearing bush 24, so that the base material is also free of martensite in its surface region that receives the coating.

Naturally, instead of the laser source used as a heating device in the embodiment according to FIG. 3, it is also possible to use other types of heating devices that produce a heated spot. A preferred embodiment can be a heating device that consists of an induction coil that is supplied with electric current, which can be controlled relatively simply. Therefore, this allows the heat input into the base material of the supporting part to be exactly metered.

Another method provides for the coating material to be applied by cold gas spraying. The advantage of this method is that, during the cold gas spraying process, the coating material, which is present in powdered form and thus as powder particles, is accelerated in a gas jet to high velocities, with no melting of the particles occurring in the gas jet. The coating is produced solely by the high kinetic energy upon impact on the base material of the supporting part.

The invention claimed is:

1. A plain bearing with at least one bearing bush (24) made of a ferrous base material, whose bearing surface is provided with a coating (8, 26), which consists of coating material and is metallurgically bonded with the base material by a bonding zone (9) that contains $FeSn_2$, wherein the thickness of the bonding zone that contains $FeSn_2$ is at most 10 µm, wherein the thickness of the bonding zone (9) corresponds to the depth of diffusion of an Sn-containing layer melted onto the ferrous base material.

2. A plain bearing in accordance with claim 1, wherein the thickness of the bonding zone (9) that contains $FeSn_2$ is at most 0.5 to 5 µm.

3. A plain bearing in accordance with claim 1, wherein the base material of the bearing bush (24) is free of martensite, at least in its region that receives the coating (26).

4. A plain bearing in accordance with claim 1, wherein the coating (8, 26) has a homogeneous structure over its thickness as well as a uniform distribution of $Cu_6Sn_5$ crystals and SbSn crystals, wherein the homogeneous structure is a fine crystallization structure.

5. A plain bearing in accordance with claim 4, wherein crystals incorporated in the coating (8, 26) have a size that is less than or equal to 5 µm, and have a globular structure.

6. A plain bearing in accordance with claim 1, wherein a bearing metal that forms the coating (8, 26) is free of toxic elements.

7. A plain bearing in accordance with claim 1, wherein the coating (8, 26) comprises several layers (8a, 8b) applied one over the other.

8. A plain bearing in accordance with claim 7, wherein the layers (8a, 8b) of the coating (8, 26) consist, at least in part, of different materials.

9. A plain bearing in accordance with claim 1, wherein a bearing metal that forms the coating contains only tin (Sn), antimony (Sb), and copper (Cu).

10. A plain bearing in accordance with claim 1, wherein a bearing metal that forms the coating also contains nontoxic elements.

11. A plain bearing in accordance with claim 1, further comprising a supporting part (25) composed of steel.

12. A plain bearing in accordance with claim 1, wherein the bearing bush (24) has the coating (26) consisting of bearing metal on its radially inner side.

13. A plain bearing in accordance with claim 1, wherein the plain bearing is designed as a hydrodynamic plain bearing.

14. A plain bearing in accordance with claim 1, wherein the plain bearing is designed as a hydrostatic plain bearing.

15. The use of a plain bearing in accordance with claim 1 in the iron and steel industry for rolling stands or presses.

16. Use of a plain bearing in accordance with claim 15 for supporting rolls in a rolling stand for rolling metallic and nonmetallic strips, sheets, and sections.

17. A plain bearing in accordance with claim 1, wherein the Sn-containing layer is a layer of Babbitt metal.

18. A method for producing the plain bearing of claim 1, comprising the steps of: providing the bearing surface of the bearing bush (24) made of a ferrous base material with the coating (26) that has at least one layer (8a, 8b) and consists at least partially of bearing metal, and where at least the layer (8a) adjacent to the bearing bush (24) consists of a material that contains Sn, which is supplied to the surface to be coated in solid form and is melted onto the ferrous base material, wherein the energy for melting on at least the first layer of the coating is transferred to the surface to be coated and to the coating material supplied to this surface in a controlled way, so that only the coating material completely melts, while the ferrous base material remains in a completely solidified state.

19. A method in accordance with claim 18, wherein a bonding zone (9) that contains $FeSn_2$ is produced in the boundary zone between the coating (8, 26) and the base material by means of a diffusion process.

20. A method in accordance with claim 18, wherein the surface of the base material that is to be coated is cleaned and/or roughened before the coating operation is carried out.

21. A method in accordance with claim 18, wherein the bearing metal, is fed to the surface to be coated as powder and/or as round or angular wire and/or as round or angular strip.

22. A method in accordance with claim 21, wherein the powder or the wire is supplied on the inner circumference of the bearing in different predetermined zones of the same or different bearing metals in order to produce bearing surfaces with different properties.

23. A method in accordance with claim 18, wherein the coating material has a thickness that is predetermined in such a way that the maximum of the shear stresses due to the bearing load is located outside the bonding zone (9) and inside the coating (8, 26).

24. A method in accordance with claim 18, wherein the coating material is fed to the surface to be coated in such a way that it encounters a laser beam (12).

25. A method in accordance with claim 18, wherein the coating material is applied to the base material in the form of a succession of parallel beads.

26. A method in accordance with claim 18, wherein, to melt on at least the first layer (8a) of the coating (26), a heating device is used that produces a heated spot and can be moved relative to the bearing bush (24).

27. A method in accordance with claim 26, wherein all layers of the coating are melted on.

28. A method in accordance with claim 25, wherein the coating material is fed to the surface to be coated in the given heated spot produced by the transfer of energy.

29. A method in accordance with claim 18, wherein several layers of coating material are melted on one over the other.

30. A method in accordance with claim 18, wherein the upper side of at least the last layer (8b) melted onto the base material and the upper sides of all of the layers (8a, 8b) are evened by supplying energy.

31. A method in accordance with claim 18, wherein protective gas is supplied around each layer of molten coating material until it has solidified.

32. A method in accordance with claim 18, wherein a YAG laser, a $CO_2$ laser, a diode laser, or a fiber-coupled diode laser, is used to produce the laser beam (12).

33. A method in accordance with claim 18, wherein the coating material is applied by cold gas spraying.

* * * * *